United States Patent [19]
Graham et al.

[11] Patent Number: 5,355,141
[45] Date of Patent: Oct. 11, 1994

[54] CHANNELIZED BEARING PROCESSOR

[75] Inventors: Stephen P. Graham, Hove; Michael W. Keeping, Crawley, both of England

[73] Assignee: Thorn EMI Electronics Limited, Hayes, England

[21] Appl. No.: 965,377

[22] PCT Filed: Jun. 19, 1991

[86] PCT No.: PCT/GB91/00985
§ 371 Date: Dec. 18, 1992
§ 102(e) Date: Dec. 18, 1992

[87] PCT Pub. No.: WO91/19995
PCT Pub. Date: Dec. 26, 1991

[30] Foreign Application Priority Data

Jun. 20, 1990 [GB] United Kingdom ............... 9013786

[51] Int. Cl.⁵ ............... G01S 5/04; G01S 13/00; H04B 17/02; H04B 1/06
[52] U.S. Cl. ............... 342/444; 342/98; 342/437; 455/136; 455/258
[58] Field of Search ............... 342/98, 100, 101, 444, 342/378, 445, 89, 97, 423, 437, 432; 455/136, 150.1, 131, 140, 139, 255, 258

[56] References Cited

U.S. PATENT DOCUMENTS 3,886,556 5/1975 Lowman ............... 342/437

*Primary Examiner*—Gregory C. Issing
*Attorney, Agent, or Firm*—Keck, Mahin & Cate

[57] ABSTRACT

A channelised bearing processor comprises a channelised receiver consisting of a plurality of i.f. receivers (34 to 42) covering contiguous parts of a predetermined frequency range. Each of the receivers (34 to 42) is connected to a respective, continuously energised local oscillator (35 to 43). A plurality of direction finding antennas (10 to 15) are coupled to respective receiving channels for producing an amplitude signal. Each receiving channel includes a tunable i.f. receiver (24A to 24F) having an input (26A to 26F) for a local oscillator signal. A local oscillator selector (50) is responsive to an output from one of the channelised receivers (34 to 42) to connect the local oscillator (35 to 43) connected to that one of the channelised receivers (34 to 42) to the local oscillator signal inputs (26A to 26F) of the tunable i.f. receivers (24A to 24F) in the receiving channels.

10 Claims, 1 Drawing Sheet

CHANNELIZED BEARING PROCESSOR

TECHNICAL FIELD

The present invention relates to a channelised bearing processor which determines the direction and characteristics of an unknown signal source. Such a processor has application wherever it is necessary to locate the positions of transmitters which emit pulsed or continuous wave (CW) signals at frequencies for example typically in the range of 0.5 to 18 GHz.

BACKGROUND ART

It is known to use wideband receivers for direction finding. Typically a system comprises a circular array of wide angled antennas, each of which is coupled to a respective wideband receiver. At the detection of a signal within the frequency range of the wideband receiver, an output proportional to the amplitude of the signal as received is produced. The respective amplitude signals are supplied to a bearing processor which determines the bearing of the source of signals. If it is desired to measure characteristics of the received signal, such as its frequency, then for example an instantaneous frequency measuring device is coupled to either an omni-directional antenna or a combination of the bearing array antennas so arranged as to give omni-coverage. The use of wideband receivers for direction finding has a number of limitations. In particular, they are not suitable for measuring characteristics (or emitter parameters) in increasingly dense scenarios in which simultaneously occurring signals have different characteristics and relatively short durations.

DISCLOSURE OF INVENTION

It is an object of the present invention to be able to resolve the directions and determine the characteristics of two or more simultaneously occurring short duration signals.

According to the present invention there is provided a channelised bearing processor characterised by a channelised receiver formed by a plurality of receivers covering respective predetermined frequency ranges, a local oscillator coupled to each of the receivers, a plurality of receiving channels for producing an amplitude signal, each said receiving channel having an input for receiving an input signal and a tunable receiver having an input for a local oscillator signal, and local oscillator selecting means responsive to an output from one of the plurality of receivers to connect the local oscillator connected to that one of the plurality of receivers to the local oscillator signal inputs of the tunable receivers.

The present invention provides a channelised bearing processor characterised by a plurality of signal inputs coupled to respective frequency down-conversion stages, each of which stages provides in use an i.f. output, delay means for delaying the respective i.f. outputs, a tunable receiver coupled to each of the delay means, each tunable receiver having a local oscillator signal input, a plurality of local oscillators, each producing a different frequency, selector means for selecting one of the outputs produced by the plurality of local oscillators and supplying it to the local oscillator signal inputs of the tunable receivers, a channelised receiver comprising a plurality of i.f. receivers, each operative to receive signals in respective predetermined frequency ranges, each said i.f. receiver having means for providing an indication that it has received a signal in its respective predetermined frequency range, said indication being supplied to the selector means for use in selecting the local oscillator to be connected to the local oscillator signal inputs of the tunable receivers.

The channelised bearing processor is able to resolve the bearings of two or more simultaneously occurring signals since only one amplitude sample is required to calculate the bearing. Thereafter the tunable receiver can be retuned after one sample period in order to measure the bearing of another signal. In this way bearings of simultaneously occurring signals can be calculated subject to the proviso that they are present for more than one sampling period.

The channelised receiver may comprise a plurality of integrated i.f. receivers and each of the tunable receivers may comprise an integrated i.f. receiver.

The integrated i.f. receivers comprising the channelised receiver and the tunable receivers may comprise receivers of the type described and claimed in European Patent Application 0346986, which receivers are capable of detecting short duration or CW signals and of operating over a large dynamic range.

The channelised receiver may be preceded by a frequency down conversion stage. Said frequency down conversion stage and the frequency down conversion stages coupled to the signal inputs coupled for example to direction finding antennas, each have an input coupled to a common local oscillator stage. The common local oscillator may be a microwave local oscillator producing a signal having a frequency selected to provide an output at UHF from the frequency down conversion stages.

An advantage of having an output at UHF is that the delay means may comprise UHF delay lines which are of such a length as to allow local oscillator frequency selection to take place without foreshortening the signal.

Each of the plurality of local oscillators may be coupled to a respective one of the integrated zero i.f. receivers forming the channelised receiver. Such an arrangement avoids having to have separate local oscillators for channelised receiver and for the tunable receivers. Furthermore, by the local oscillators being continuously energised they can be switched rapidly to the frequency down conversion stages of the tunable receivers. If a frequency synthesiser were used for providing the local oscillator signal for the frequency down conversion stages of the tunable receivers, it has the drawback that following each retuning of the synthesiser allowance has to be made for the settling time of the synthesiser, which time allowance determines the speed of operation of the bearing processor when looking at several simultaneously occurring signals.

BRIEF DESCRIPTION OF DRAWINGS

The present invention will now be described, by way of example, with reference to the FIG. 1 of the accompanying drawings which figure is a block schematic diagram of a direction finding system including a channelised bearing processor made in accordance with the present invention.

BEST MODE FOR CARRYING OUT THE INVENTION

Figure 1:
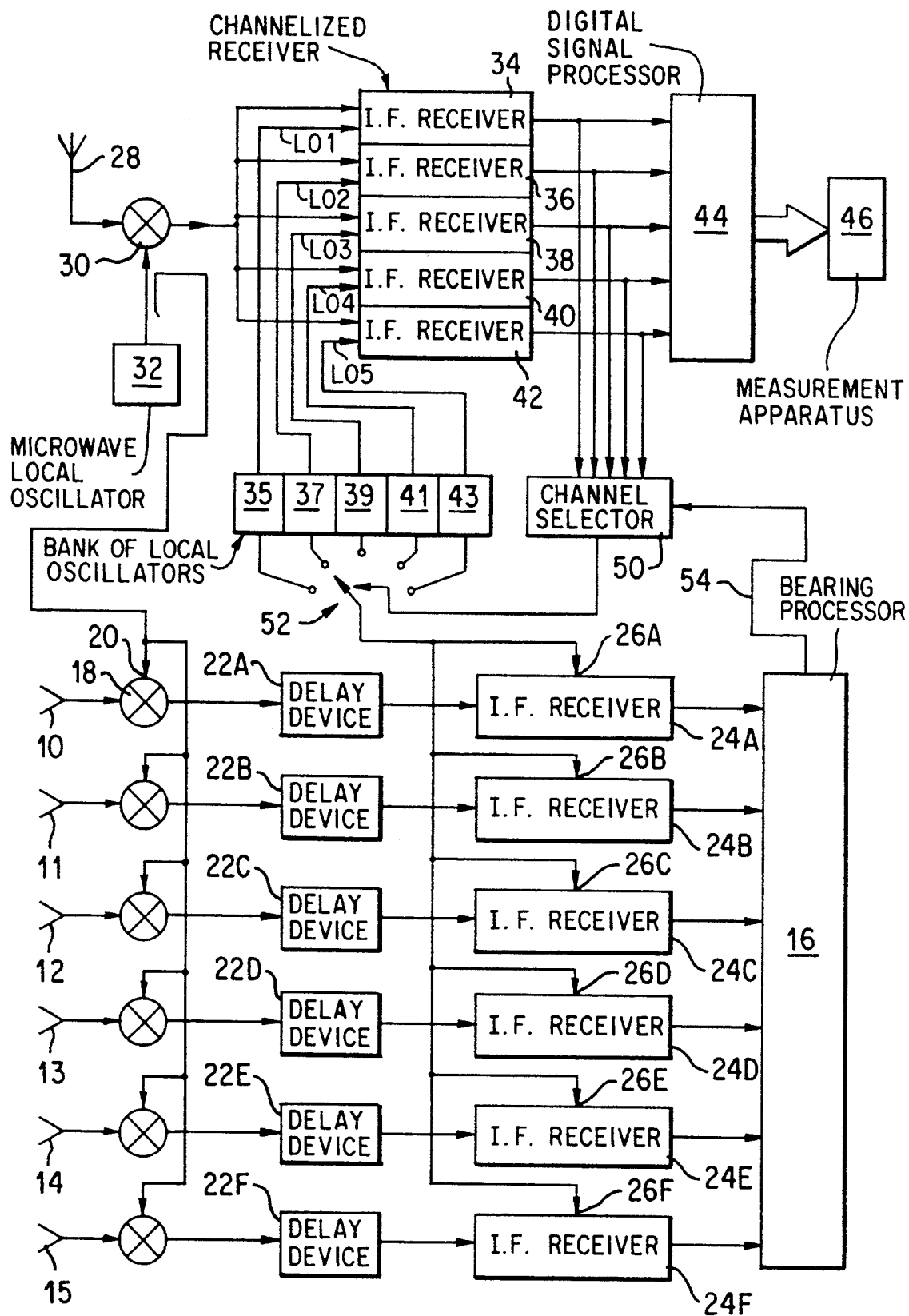

The illustrated direction finding system comprises a circular array of six outwardly facing direction finding antennas 10 to 15 which are connected by way of suitable microwave links to respective receiving channels for deriving amplitude signals which are applied to a bearing processor 16, known per se, for calculating the bearing of the source emitting the transmitted signal. Each receiving channel is identical and for convenience of description only one channel will be referred to.

The direction finding antenna 10 is connected to a microwave frequency down conversion stage 18 in which a received microwave signal having a frequency in the range Z to 18 GHz is mixed with a microwave local oscillator signal applied to an input 20 to produce an output signal at UHF. The output signal is delayed for a predetermined time in a delay device 22A formed by a UHF delay line. The delayed UHF signal is then applied to an i.f. receiver 24A which may be an integrated receiver in which it is frequency down-converted to, say, baseband and used to produce an amplitude signal which is applied to the bearing processor 16. In view of the fact that the UHF signal may be present anywhere in a relatively broad frequency range and since the i.f. receiver 24A has a relatively narrow operational bandwidth, it is necessary to choose an appropriate frequency for the local oscillator signal applied to an input 26A of the receiver 24A. The selection of this local oscillator frequency has to be rapid if the receiver 24A is to detect the signal (or one of the signals present) and be able to retune to detect another, simultaneously occurring signal received at the antenna.

In order to be able to characterise the received signal(s) another receiving channel is provided. This channel comprises an omni-directional antenna 28 which is connected to a frequency down conversion stage formed by a mixer 30 and a microwave local oscillator 32 which generates the same local oscillator frequency as is applied to the input 20 of the mixer 18. For convenience, the local oscillator signal for the microwave frequency down conversion stages coupled to the antennas 10 to 15 is coupled-out from the output of the local oscillator 32. The output signal from the mixer 30 is at UHF and is applied to a channelised receiver formed by a bank of i.f. receivers 34, 36, 38, 40 and 42 which may be implemented as integrated zero i.f. receivers. Each of these receivers is supplied with a respective UHF local oscillator signal L01, L02, L03, L04, L05 derived from a bank of continuously energised oscillators 35, 37, 39, 41, 43. The receivers 34 to 42 are of a similar type to the receivers 24A to 24F and, for example, are implemented as disclosed in European Patent Application 0346986. The local oscillator frequencies L01 to L05 are selected so that contiguous parts of the frequency band of the system are covered by respective receivers. Thus one of the receivers 34 to 42 will produce an output in response to a signal in the specified frequency range being picked up by the antenna 28. Outputs of the receivers 34 to 42 are connected to a digital signal processor 44 which produces a parallel digital output which is connected to a measurement apparatus 46 for determining such characteristics as time of arrival (TOA), frequency and pulse width.

The outputs of the receivers 34 to 42 are also connected to a channel selector 50 which provides a control signal for operating a multiway switch 52. The multipleinputs to the switch 52 are connected respectively to the local oscillators 35 to 43 and the common terminal is controlled to connect one of the local oscillator signals L01 to L05 to the local oscillator inputs 26A to 26F of the receivers 24A to 24F.

In operation the channel selector 50 receives an output signal from that one of the receivers 34 to 42 which detects a signal in its part of the frequency range, for example the receiver 36, and operates the switch 52 to connect the local oscillator 37 to the inputs 26A to 26F thereby tuning them so that they can process the signal selected.

In the event of there being two or more signals occurring simultaneously which are detected by different ones of the receivers 34 to 42, the channel selector 50 selects one of the outputs and uses this to actuate the switch 52. Once an amplitude signal has been produced a control signal is sent to the channel selector 50 by way of a line 54 and in response to this control signal the channel selector 50 actuates the switch 52 to select another local oscillator signal L01 to L05 to connect to the inputs 26A to 26F. Since the local oscillators 35 to 43 are continuously operating, they can be switched rapidly without requiring any substantial settling time. Although the multiway switch 52 has been illustrated in a conventional way it is to be understood that in practice it will comprise a suitable electronic switching means which is able to achieve the rapid switching speeds required.

The time delay introduced by the UHF delay lines 22A to 22F is chosen to take into account the signal processing time required to select the appropriate local oscillator signal for the receivers 24A to 24F.

In the illustrated embodiment the frequencies of the local oscillators 35 to 43 are selected to enable the channelised receiver to cover different contiguous parts of a frequency band but it is possible to select the local oscillator frequencies 30 such that predetermined, but not necessarily contiguous, parts of the frequency band are covered.

From the present disclosure, other modifications will be apparent to persons skilled in the art. Such modifications may involve other features which are already known in the design, manufacture and use of channelised bearing processor systems and component parts thereof and which may be used instead of or in addition to features already described herein.

INDUSTRIAL APPLICABILITY

The present invention is applicable to direction finding systems.

We claim:

1. A channelised bearing processor comprising (a) a channelised receiver formed by a plurality of channel receivers covering respective predetermined frequency ranges, (b) a plurality of receiving channels for producing an amplitude signal, each said receiving channel having an input for receiving an input signal and a tunable receiver having an input for a local oscillator signal, and (c) tuning control means responsive to an output from one of the plurality of channel receivers to control the tuning of the tunable receivers to correspond to the tuning of that one of the plurality of channel receivers, characterised in that the channelised receiver includes a respective local oscillator coupled to each of the channel receivers and in that the tuning control means comprises local oscillator selecting means for connecting the local oscillator which is connected to that one of the plurality of channel receivers to the local oscillator signal inputs of the tunable receivers.

2. A channelised bearing processor comprising a plurality of signal inputs coupled to respective frequency down-conversion stages, each of which stages provides in use an i.f. output, delay means for delaying the respective i.f. outputs, a respective tunable receiver coupled to each of the delay means, each tunable receiver having a local oscillator signal input, tuning control means for controlling the tuning of the tunable receivers, a channelised receiver comprising a plurality of i.f. channel receivers, each operative to receive signals in respective predetermined frequency ranges, each said i.f. channel receiver having means for providing an indication that it has received a signal in its respective predetermined frequency range, said indication being supplied to the tuning control means for use in controlling the tuning of the tunable receivers, characterised in that a plurality of local oscillators each producing a different frequency and each connected to a respective one of the i.f. channel receivers is provided, and in that the tuning control means comprises selector means for responding to a said indication by selecting the output of the local oscillator which is connected to the corresponding i.f. channel receiver and supplying it to the local oscillator signal inputs of the tunable receivers.

3. A processor as claimed in claim 2, characterised in that each of the i.f. channel receivers comprises an integrated i.f. receiver and each of the tunable receivers comprises an integrated i.f. receiver.

4. A processor as claimed in claim 3, wherein said frequency down conversion stages each have an input coupled to a common further local oscillator, characterised in that a further frequency down conversion stage having an input coupled to said further local oscillator is connected to inputs of said i.f. channel receivers.

5. A processor as claimed in claim 4, characterised in that the common further local oscillator is a microwave oscillator having a frequency selected to down-convert a received signal to a UHF i.f. output.

6. A processor as claimed in claim 5, characterised in that the delay means comprise UHF delay lines.

7. A processor as claimed in claim 6, characterized in that each of the local oscillators has an output coupled to a respective one of the i.f. receivers of the channelised receiver.

8. A processor as claimed in claim 2, wherein said frequency down conversion stages each have an input coupled to a common further local oscillator, characterised int hat further frequency down conversion stage having an input coupled to said further local oscillator is connected to inputs of said i.f. channel receivers.

9. A processor as claimed in claim 8, characterised in that the common further local oscillator is microwave oscillator having a frequency selected to down-convert a received signal to a UHF i.f. output.

10. A processor as claimed in claim 9, characterised in that the delay means comprise UHF delay lines.

* * * * *